US012771050B2

(12) United States Patent
Dossmann et al.

(10) Patent No.: US 12,771,050 B2
(45) Date of Patent: Oct. 20, 2026

(54) INSULATION PIERCING CONNECTOR ASSEMBLIES WITH CAPTIVE CABLE END CAPS

(71) Applicants: TE Connectivity Solutions GmbH, Schaffhausen (CH); Tyco Electronics—SIMEL, Gevrey-Chambertin (FR)

(72) Inventors: Julien Dossmann, Brochon (FR); Austin Draughn, Garner, NC (US); George Pullium, III, Garner, NC (US)

(73) Assignee: TE CONNECTIVITY SOLUTIONS GmbH et al, Schaffhausen (CH)

( * ) Notice: Subject to any disclaimer, the term of this patent is extended or adjusted under 35 U.S.C. 154(b) by 380 days.

(21) Appl. No.: 18/510,075

(22) Filed: Nov. 15, 2023

(65) Prior Publication Data

US 2024/0275079 A1 Aug. 15, 2024

Related U.S. Application Data

(60) Provisional application No. 63/484,236, filed on Feb. 10, 2023.

(51) Int. Cl.
*H01R 4/24* (2018.01)
*H01R 4/22* (2006.01)
*H01R 4/2408* (2018.01)

(52) U.S. Cl.
CPC ............. *H01R 4/2408* (2013.01); *H01R 4/22* (2013.01)

(58) Field of Classification Search
None
See application file for complete search history.

(56) References Cited

U.S. PATENT DOCUMENTS 6,106,323 A * 8/2000 Elisei .................. H01R 4/2408 439/892
2020/0266554 A1* 8/2020 Johnson .................. H01R 4/44

FOREIGN PATENT DOCUMENTS

| | | | |
|---|---|---|---|
| AU | 2011100143 | A4 | 3/2011 |
| FR | 2601516 | A2 | 1/1988 |
| FR | 2842655 | B1 | 5/2009 |
| GB | 2219442 | A | 12/1989 |

OTHER PUBLICATIONS

Extended European Search Report, European Application No. 24156903.7-1201, European Filing Date, Jun. 25, 2024.

* cited by examiner

*Primary Examiner* — Ross N Gushi

(57) ABSTRACT

An electrical connector assembly includes an insulation piercing connector having a pair of clamping jaws. At least one of the jaws includes at least one electrically conductive piercing member, and a male connector member extending outwardly from one of the clamping jaws. A clamping mechanism is configured to force the at least one piercing member through the insulation layers of the first and second cables and into electrical engagement with the conductors of the first and second cables to form an electrical connection between the first and second cables. An elastomeric seal is inserted over the terminal end of the first cable, and a protective end cap is secured to the male connector member and encloses the terminal end of the first cable.

20 Claims, 18 Drawing Sheets

INSULATION PIERCING CONNECTOR ASSEMBLIES WITH CAPTIVE CABLE END CAPS

RELATED APPLICATION

This application claims the benefit of and priority to U.S. Provisional Patent Application No. 63/484,236 filed Feb. 10, 2023, the disclosure of which is incorporated herein by reference as if set forth in its entirety.

FIELD

The present inventive concept relates generally to electrical connectors and, more particularly, to insulation piercing connectors.

BACKGROUND

Electrical conductors often must be terminated or joined in various environments, such as underground or overhead. Such conductors may be, for example, low voltage electrical distribution lines. In order to form such connections, a connector may be employed. For example, in electrical power systems, it is occasionally necessary to tap into an electrical power line. One known system for tapping into an electrical power line is to use a tap connector for electrically connecting a main line electrical cable to an end of a tap line electrical conductor.

Insulation piercing (IP) connectors are commonly used to form mechanical and electrical connections between insulated cables. Typically, an IP connector includes metal piercing blades with sets of teeth on either end thereof. The piercing blades are mounted in housing members (e.g., along with environmental sealing components). The housing members are clamped about the insulated main and tap cables so that one set of teeth of a piercing blade engages the main cable and the other set of teeth of the piercing blade engages the tap cable. The teeth penetrate the insulation layers of the cables and make contact with the underlying conductors, thereby providing electrical continuity between the conductors through the piercing blade.

The end of the main cable is then covered with an end cap. Unfortunately, conventional end caps may be susceptible to being removed as a result of a pull-out action or an impact to the IP connector.

SUMMARY

According to some embodiments of the present inventive concept, an electrical connector assembly is provided for mechanically and electrically connecting first and second cables, each including an elongate electrical conductor covered by an insulation layer. The electrical connector assembly includes an insulation piercing connector having a pair of clamping jaws. At least one of the jaws includes at least one electrically conductive piercing member. A male connector member extends outwardly (e.g., in a direction transverse to a lengthwise axis of the first cable) from one of the clamping jaws. A clamping mechanism is configured and operable to force the at least one piercing member through the insulation layers of the first and second cables and into electrical engagement with the conductors of the first and second cables to form a connection including the insulation piercing connector and the first and second cables wherein the conductors of the first and second cables are electrically connected to one another through the at least one piercing member. An elastomeric seal is inserted over the terminal end of the first cable, and then a protective end cap is secured to the male connector member and is configured to enclose (e.g., snugly enclose) the terminal end of the first cable. The electrical connector assembly also includes an enclosure that is configured to receive and cover the connection and to protect the insulation piercing connector.

In some embodiments, the protective end cap includes first and second portions that are pivotally connected by a hinge. The first and second portions are relatively pivotable about the hinge between an open position to receive the terminal end of the first cable and a closed position. In the closed position, the first and second portions define an enclosure cavity that is configured to enclose (e.g., snugly enclose) the terminal end of the first cable with the elastomeric seal thereon.

In some embodiments, the first portion of the end cap includes a female connector member that is shaped to matingly receive the male connector member. A free end portion of the second portion of the end cap is configured to be attached to the female connector member when the first and second portions are in the closed position such that the male connector is securely enclosed.

In some embodiments, the first and second portions of the end cap have locking or attachment features that are configured to engage with each other and lock the first and second portions together when in the closed position.

In some embodiments, the second portion of the end cap includes a member that is configured to engage an outer surface of the first cable and restrict access into the enclosure cavity when the first and second portions of the end cap are in the closed position.

In some embodiments, at least one of the first and second portions of the end cap include one or more removable spacers that facilitate the enclosure cavity snugly enclosing the terminal end of the first cable. As such, cables of different sizes may be accommodated within the enclosure cavity.

In some embodiments, the first and second portions of the end cap are semi-cylindrical.

In some embodiments, the male connector member is integrally formed with the clamping jaw. In other embodiments, the male connector member is a separate component that is attached to the clamping jaw (e.g., removably attached to the clamping jaw).

According to some embodiments of the present inventive concept, an electrical connector assembly is provided for mechanically and electrically connecting first and second cables, each including an elongate electrical conductor covered by an insulation layer. The electrical connector assembly includes an insulation piercing connector having a pair of clamping jaws, a clamping mechanism, an elastomeric seal, and a protective end cap. At least one of the jaws includes at least one electrically conductive piercing member, and a male connector member extends outwardly from one of the clamping jaws (e.g., in a direction transverse to a lengthwise axis of the first cable). The clamping mechanism is configured and operable to force the at least one piercing member through the insulation layers of the first and second cables and into electrical engagement with the conductors of the first and second cables to form an electrical connection between the first and second cables. The elastomeric seal is inserted over the terminal end of the first cable, and then the protective end cap is secured to the male connector member and is configured to enclose (e.g., snugly enclose) the terminal end of the first cable. The end cap includes first and second portions pivotally connected by a hinge such that the first and second portions are relatively pivotable about the hinge between an open position to receive the terminal end of the first cable and a closed position wherein the first and second portions define an enclosure cavity configured to enclose the terminal end of the first cable.

In some embodiments, the male connector member extends outwardly from the one of the clamping jaws in a direction transverse to a lengthwise axis of the first cable. The male connector member may be integrally formed with the one of the clamping jaws or may be attached (e.g., removably attached) to the one of the clamping jaws.

In some embodiments, the first portion of the end cap includes a female connector member shaped to matingly receive the male connector member. A free end of the second portion of the end cap is configured to be attached to the female connector member when the first and second portions of the end cap are in the closed position.

In some embodiments, the first and second portions of the end cap include attachment features configured to engage with each other and to lock the first and second portions together when in the closed position.

In some embodiments, the electrical connector assembly includes an enclosure configured to receive and cover the connection and to protect the insulation piercing connector.

According to some embodiments of the present inventive concept, an electrical connector assembly is provided for mechanically and electrically connecting first and second cables, each including an elongate electrical conductor covered by an insulation layer. The electrical connector assembly includes an insulation piercing connector and a protective end cap configured to be secured to the connector member that encloses a terminal end of the first cable. The insulation piercing connector includes a pair of clamping jaws, and a clamping mechanism. At least one of the clamping jaws includes at least one electrically conductive piercing member. One of the clamping jaws includes a connector member. The clamping mechanism is configured and operable to force the at least one piercing member through the insulation layers of the first and second cables and into electrical engagement with the conductors of the first and second cables to form an electrical connection between the first and second cables.

In some embodiments, the connector member is a male connector member and the end cap comprises a female connector member shaped to matingly receive the male connector member.

In some embodiments, the end cap comprises a male connector member and the connector is a female connector member shaped to matingly receive the male connector member.

Embodiments of the present inventive concept are advantageous over conventional IP connector assemblies in that the end cap of the present inventive concept is fully secured to the IP connector. This results in a stronger end cap that is resistant to pull out and impact forces.

It is noted that aspects of the inventive concept described with respect to one embodiment may be incorporated in a different embodiment although not specifically described relative thereto That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present inventive concept are explained in detail below.

BRIEF DESCRIPTION OF THE DRAWINGS

The accompanying drawings, which form a part of the specification, illustrate various embodiments of the present inventive concept. The drawings and description together serve to fully explain embodiments of the present inventive concept.

DETAILED DESCRIPTION

Figure 1:
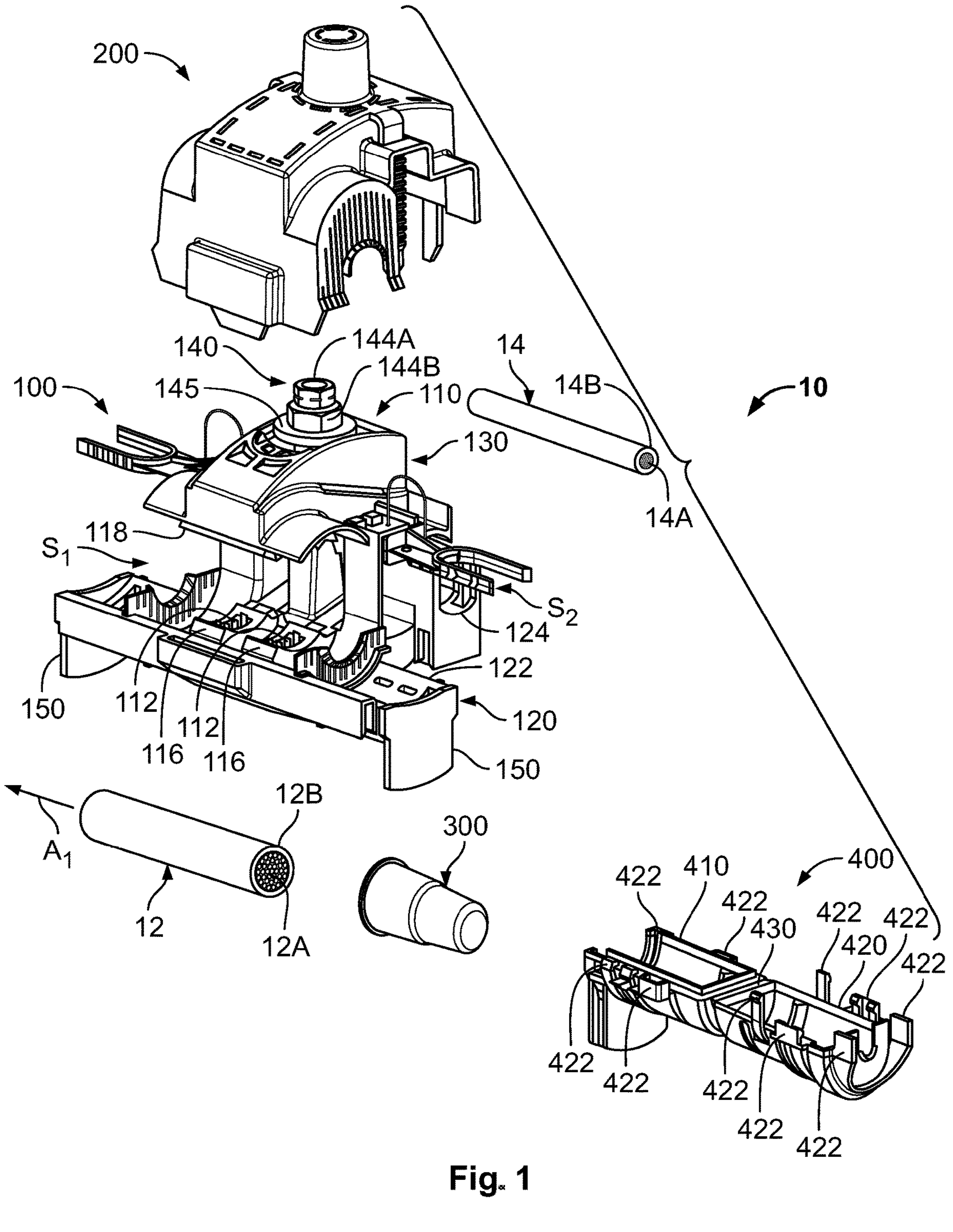
FIG. 1 is an exploded perspective view of an electrical connector assembly according to some embodiments of the present inventive concept.

Referring to FIG. 1, an electrical connector assembly 10 for mechanically and electrically connecting first and second cables 12, 14, according to embodiments of the present inventive concept is illustrated. The electrical connector assembly 10 includes an insulation piercing connector 100 (which may be referred to herein as an IPC, IP connector, or IPC connector), an enclosure assembly 200, an elastomeric seal 300 for the terminal end of the first cable 12, and an end cap 400 for enclosing the terminal end of the first cable 12. The illustrated IP connector 100 is a multi-cable insulation piercing connector configured to mechanically and electrically couple a pair of elongate conductor cables 12, 14 (e.g., electrical power lines). IP connectors are well known in the art and are described, for example, in U.S. Pat. No. 10,840,615, which is incorporated by reference in its entirety. In some embodiments, the electrical connector assembly 10 of the present inventive concept may be used in solar electrical power generation collection systems to electrically connect a plurality of distributed solar electrical generation devices to a central collection point.

The illustrated IP connector 100 may be adapted for use as a splice or tap connector for connecting an elongate electrical tap or feed cable 14 to an elongate main cable 12 of a utility power distribution system, for example. The connected cables 12, 14 may be other combinations of cables such as spliced cables, cable harnesses, etc.

The second cable 14 may be a known electrically conductive metal high, medium or low voltage cable having a generally cylindrical form in an exemplary embodiment. The first cable 12 may also be a generally cylindrical high, medium or low voltage cable. The second cable 14 includes a metal electrical conductor 14A surrounded by an insulation layer 14B. The first cable 12 includes a metal electrical conductor 12A surrounded by an insulation layer 12B. One or more of the conductors 12A, 14A may be formed of multiple strands (e.g., parallel or twisted strands), or may be solid cylindrical conductors (solid wire). Multi-strand conductors may be easier to handle with better bending characteristics. Suitable materials for the conductors 12A, 14A may include aluminum or copper. The insulation layers 12B, 14B may be formed of a polymeric material such as PVC, polypropylene, polyethylene, or cross-linked polyethylene. The conductor 14A and the conductor 12A may be of the same wire gauge or different wire gauge in different applications and the connector 100 is adapted to accommodate a range of wire gauges for the conductor 14A and the conductor 12A. In some embodiments, the conductor 12A has a larger cross-sectional diameter than the conductor 14A. In some embodiments, the IP connector 100 may be designed for specific wire gauges. For example, in some embodiments, the wire gauge of the tap cable 14 may be limited to 10 AWG (American Wire Gauge) to I/O AWG, and the wire gauge of the main cable 12 may be 500 kcmil (thousand circular mils) to 1,000 kcmil.

When installed on the first cable 12 and the second cable 14, the IP connector 100 provides electrical connectivity between the conductor 12A and the conductor 14A. This connection may be used to feed electrical power from the main conductor 12A to the tap conductor 14A in, for example, an electrical utility power distribution system. In addition, the connection may be used to feed electrical power to the main conductor 12A from a feed conductor 14A in an electrical power generation system, for example. The power distribution or generation system may include a number of main cables of the same or different wire gauge, and a number of tap or feed cables of the same or different wire gauge.

Figure 2:
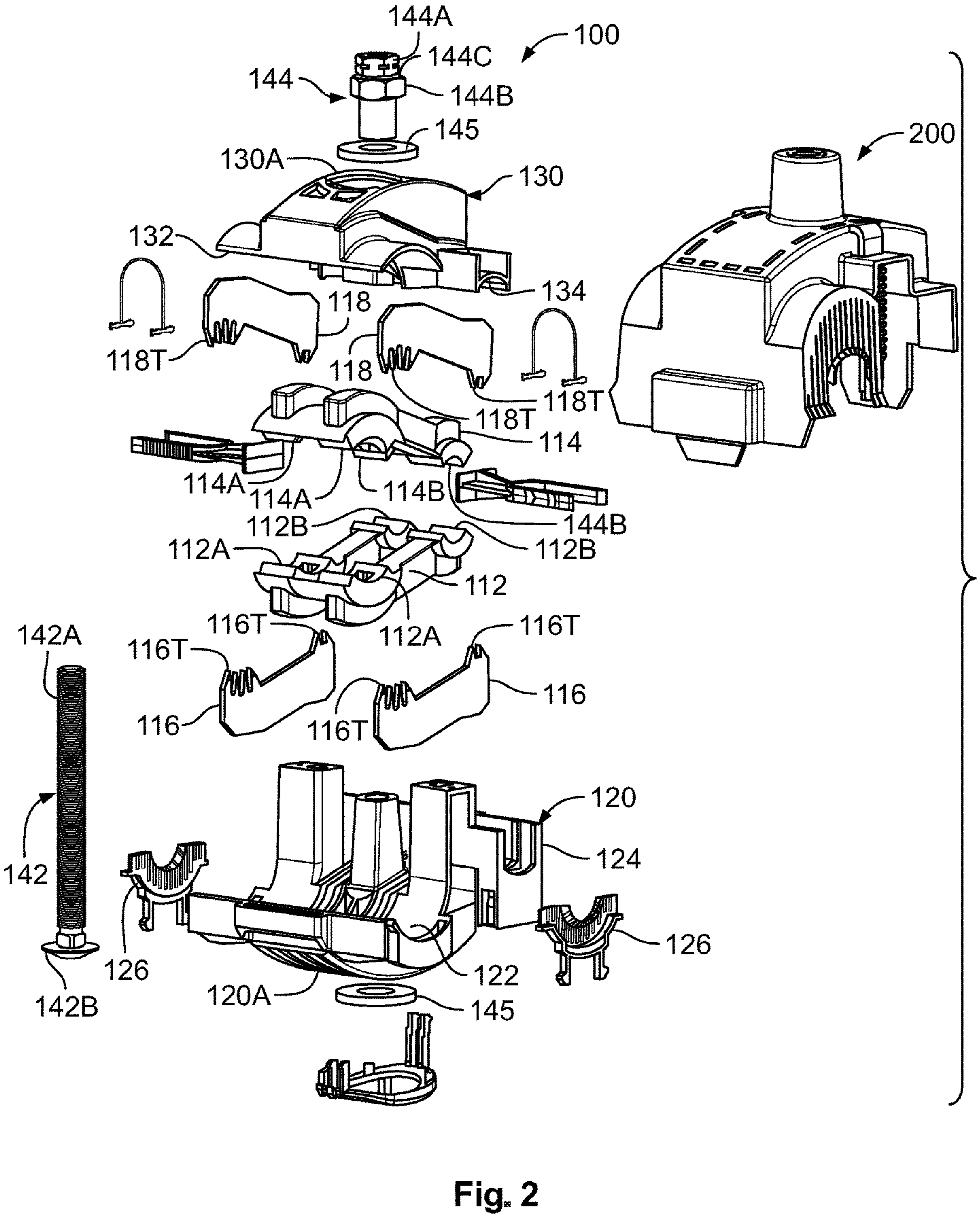
FIG. 2 is an exploded perspective view of the insulation piercing connector and enclosure of the electrical connector assembly of FIG. 1.

Referring to FIGS. 1 and 2, the IP connector 100 includes a connector body assembly 110 having a pair of clamping jaws 120, 130, also referred to as the lower clamping jaw 120 and the upper clamping jaw 130, and a clamping or compression mechanism 140. The lower clamping jaw 120 includes a cable receiving guide 122 for the first cable 12 and a cable receiving guide 124 for the second cable 14. Similarly, the upper clamping jaw 130 includes a cable receiving guide 132 for the first cable 12 and a cable receiving guide 134 for the second cable 14. The cable receiving guide 122 of the lower clamping jaw 120 and the cable receiving guide 132 of the upper clamping jaw 130 define a first or main side cable receiving slot S1 therebetween. Similarly the cable receiving guide 124 of the lower clamping jaw 120 and the cable receiving guide 134 of the upper clamping jaw 130 define a second or tap side cable receiving slot S2 therebetween.

The lower and upper clamping jaws 120, 130 may be formed of any suitable material. According to some embodiments, the clamping jaws 120, 130 are formed of a polymeric material. In some embodiments, the polymeric material is selected from the group consisting of polyamide (PA) 6.6, PA 6.6 reinforced with glass fibers or talc, polycarbonate, or polycarbonate blend. The clamping jaws 120, 130 may be formed using any suitable technique. According to some embodiments, the clamping jaws 120, 130 are molded. According to some embodiments, each of the clamping jaws 120, 130 is monolithic and unitarily formed.

The lower clamping jaw 120 includes a lower seal member 112 having a pair of openings 112A in communication with the first cable receiving slot S1, and a pair of openings 112B in communication with the second cable receiving slot S2. The upper clamping jaw 130 includes an upper seal member 114 having a pair of openings 114A in communication with the first cable receiving slot S1, and a pair of openings 114B in communication with the second cable receiving slot S2.

The lower clamping jaw 120 also includes a pair of lower blade members 116 having piercing members or teeth 116T extending through the respective openings 112A, 112B in the lower seal member 112. The upper clamping jaw 130 also includes a pair of upper blade members 118 having piercing teeth 118T extending through the respective openings 114A, 114B in the upper seal member 114. Embodiments of the present inventive concept are not limited to the illustrated number or arrangement of blade members 116, 118. Various numbers of blade members, including a single blade member, may be utilized.

A clamping mechanism 140 is configured and operable to force the piercing teeth of the lower and upper blade members 116, 118 through the insulation layers 12B, 14B of the first and second cables 12, 14 and into electrical engagement with the conductors 12A, 14A of the first and second cables 12, 14 to form a connection including the insulation piercing connector 100 and the first and second cables 12, 14. The conductors 12A, 14A of the first and second cables 12, 14 are electrically connected to one another through the lower and upper blade members 116, 118.

The clamping mechanism 140 includes a bolt 142, and a torque control member in the form of a nut 144. The bolt 142 may be a carriage bolt and includes a threaded shank 142A, and a head 142B. A washer 145 may be provided between the nut 144 and the upper clamping jaw 130, and another washer 145 may be provided between the bolt head 142B and the lower clamping jaw 120. However, other types of clamping mechanisms may be used for the compression mechanism 140. For example, the clamping mechanism may include an inclined surface device operable to provide mechanical advantage, for example.

In some embodiments and as shown, the nut 144 is a shear nut including a shear head 144A, a base portion 144B, and a shear or breakaway section 144C between the shear head 144A and base portion 144B. The bolt 142 extends through a bore 120A in the lower clamping jaw 120 and through a bore 130A in the upper clamping jaw 130 and is axially constrained by the bolt head 142B and the lower clamping jaw 120. The nut 144 is threadingly mounted on the bolt 142 and is axially constrained by the upper clamping jaw 130. The bores 120A, 130A may be round, or elongated, so that the upper clamping jaw 130 can rock as it is torqued down against two conductors with different outer diameters.

Figure 5A:
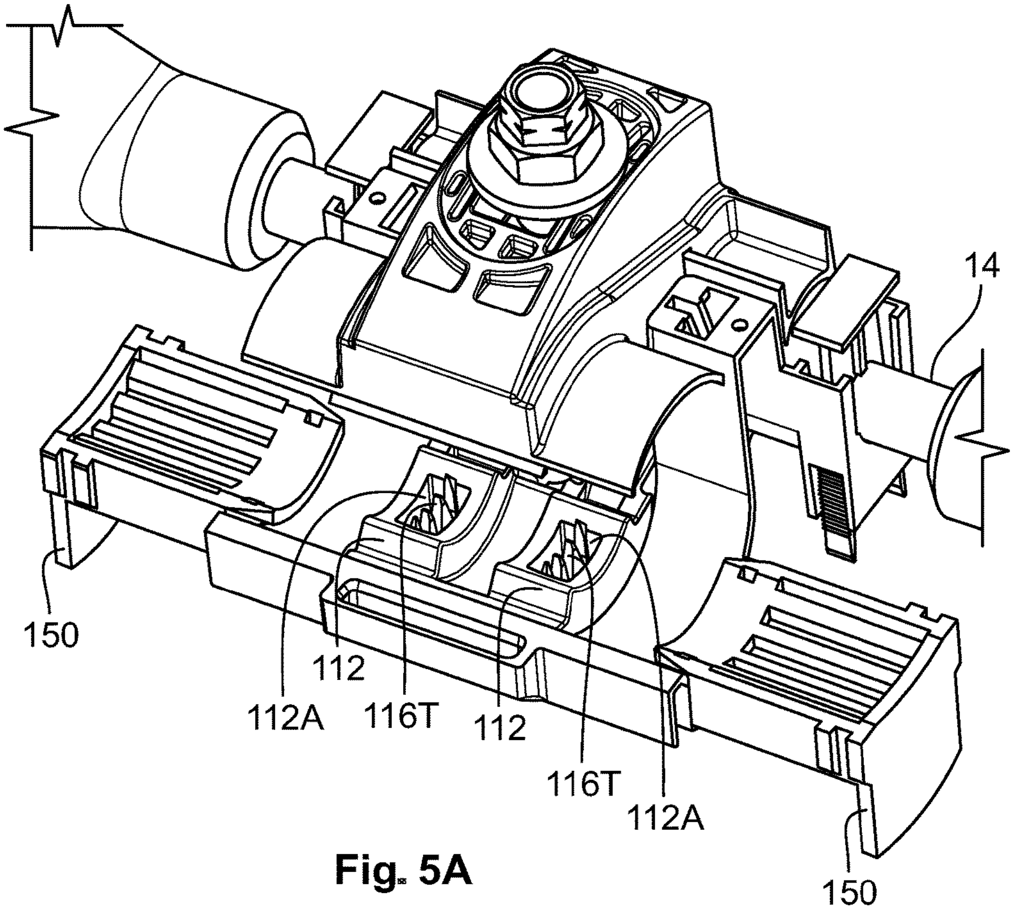
FIG. 5A is a perspective view of a lower clamping jaw of the insulation piercing connector of FIG. 1 with a male connector member secured to each side of the clamping jaw, according to some embodiments.
Figure 5B:
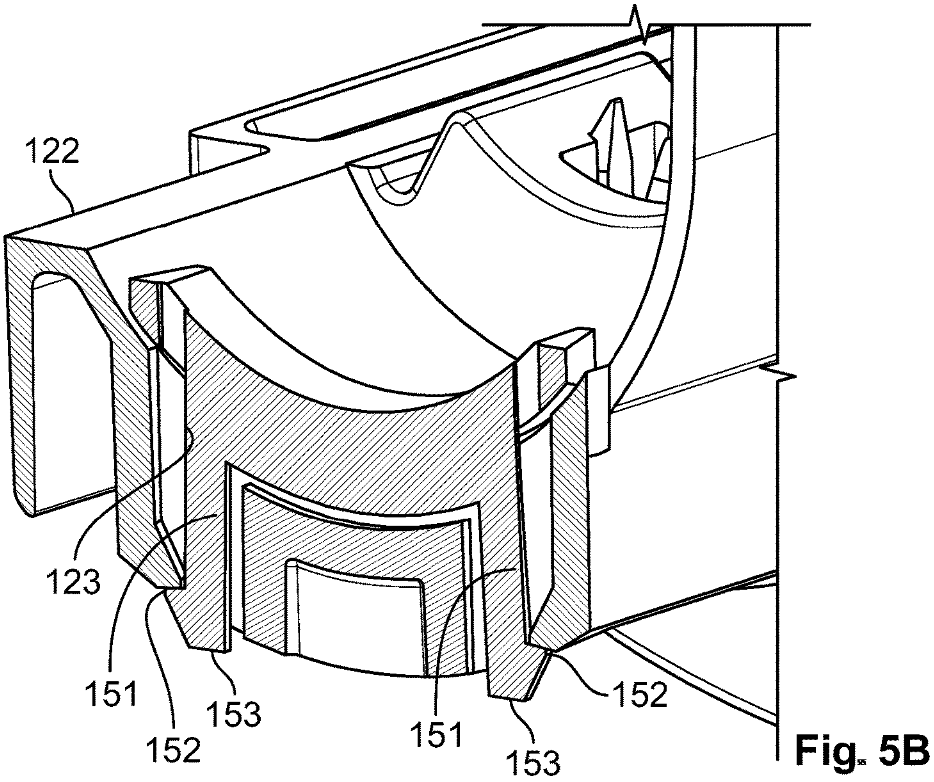
FIG. 5B is a cross-sectional view of the lower clamping jaw of FIG. 5A taken along line 5B-5B and illustrating how the male connector is secured to the clamping jaw.

As illustrated in FIG. 1, the lower clamping jaw 120 includes a male connector member 150 extending downwardly from each end of the cable receiving guide 122 and in a direction transverse to the longitudinal axis A1 of the first cable 12. In the illustrated embodiment, the male connector member 150 is in the shape of a plate or tab. However, embodiments of the present inventive concept are not limited to the illustrated shape of the male connector member 150. The male connector member 150 may have various shapes and configurations. The male connector member 150 may be integrally formed with the cable receiving guide 122 in some embodiments. In other embodiments, the male connector member 150 may be a separate component that is attached to the cable receiving guide 122. For example, as illustrated in FIGS. 5A and 5B, a male connector member 150 may be attached to the cable receiving guide 122, for example via snap fit. In some embodiments, the male connector member 150 includes a pair of arms 151 with engagement barbs 152 at the distal end 153 thereof that matingly engage with a channel 123 formed in the cable receiving guide 122, as illustrated in FIG. 5B. However, the present inventive concept is not limited to the illustrated embodiment. A male connector member 150 may be attached to the cable receiving guide 122 in various ways, without limitation. In addition, a male connector member 150 may extend outwardly from the cable receiving guide 122 in various orientations and is not limited to the illustrated orientation.

Figure 4A:
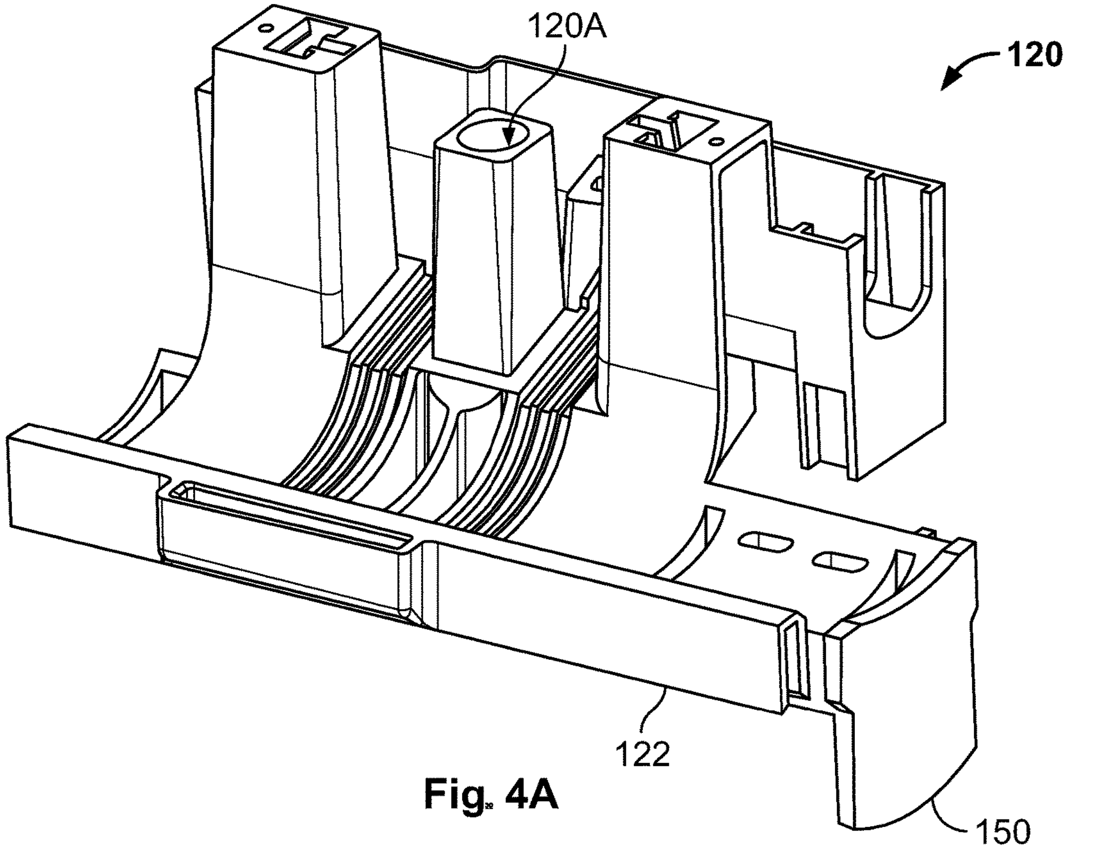
FIG. 4A is a perspective view of a lower clamping jaw of the insulation piercing connector of FIG. 1 with the male connector member positioned at one side of the clamping jaw, according to some embodiments.
Figure 4B:
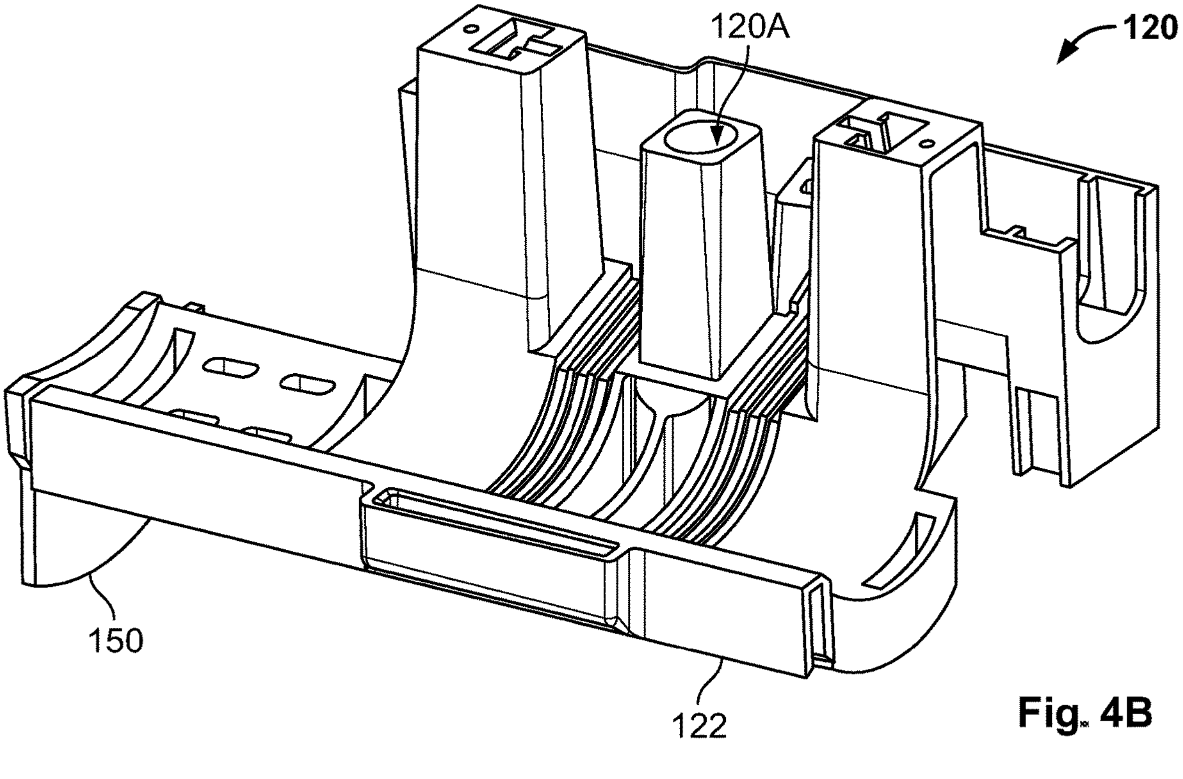
FIG. 4B is a perspective view of a lower clamping jaw of the insulation piercing connector of FIG. 1 with the male connector member positioned at an opposite side of the clamping jaw from FIG. 4A, according to some embodiments.

In the illustrated embodiment of FIG. 1, the cable receiving guide 122 has two male connector members 150, one at each end of the cable receiving guide 122. However, embodiments of the present inventive concept are not limited to the illustrated configuration of FIG. 1. For example, only a single male connector member 150 may be provided, as shown in FIGS. 4A and 4B. In FIG. 4A, a male connector member 150 is provided on one end of the cable receiving guide 122 (i.e., on one side of the lower clamping jaw 120), and in FIG. 4B, a male connector member 150 is provided on the opposite end of the cable receiving guide 122 (i.e., on the opposite side of the lower clamping jaw 120).

Figure 6A:
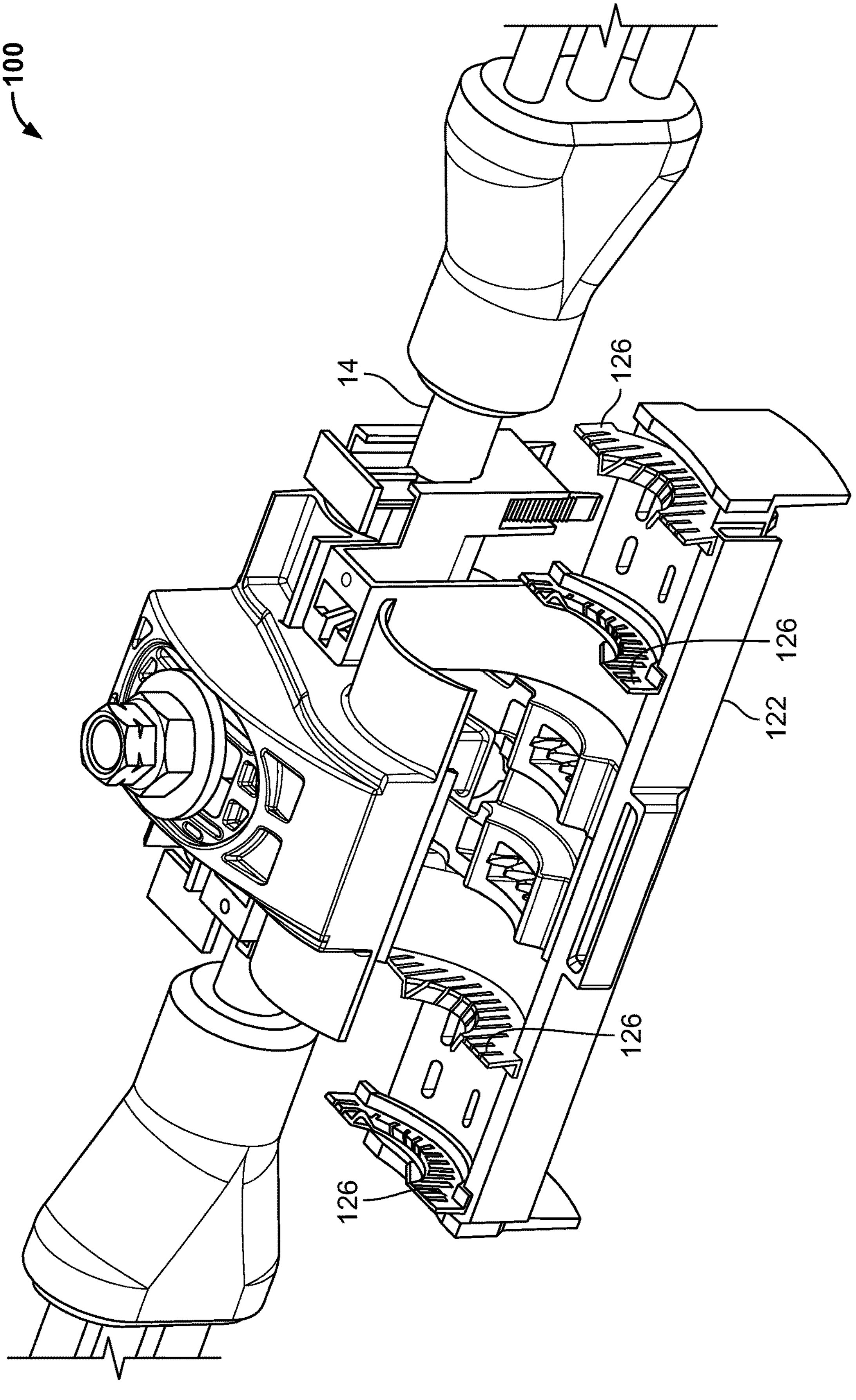
FIGS. 6A and 6B are perspective views of the insulation piercing connector of FIG. 1 with the lower clamping jaw including multiple members that are configured to engage an outer surface of the first cable and restrict access into the clamping jaws where the piercing elements are located.
Figure 6B:
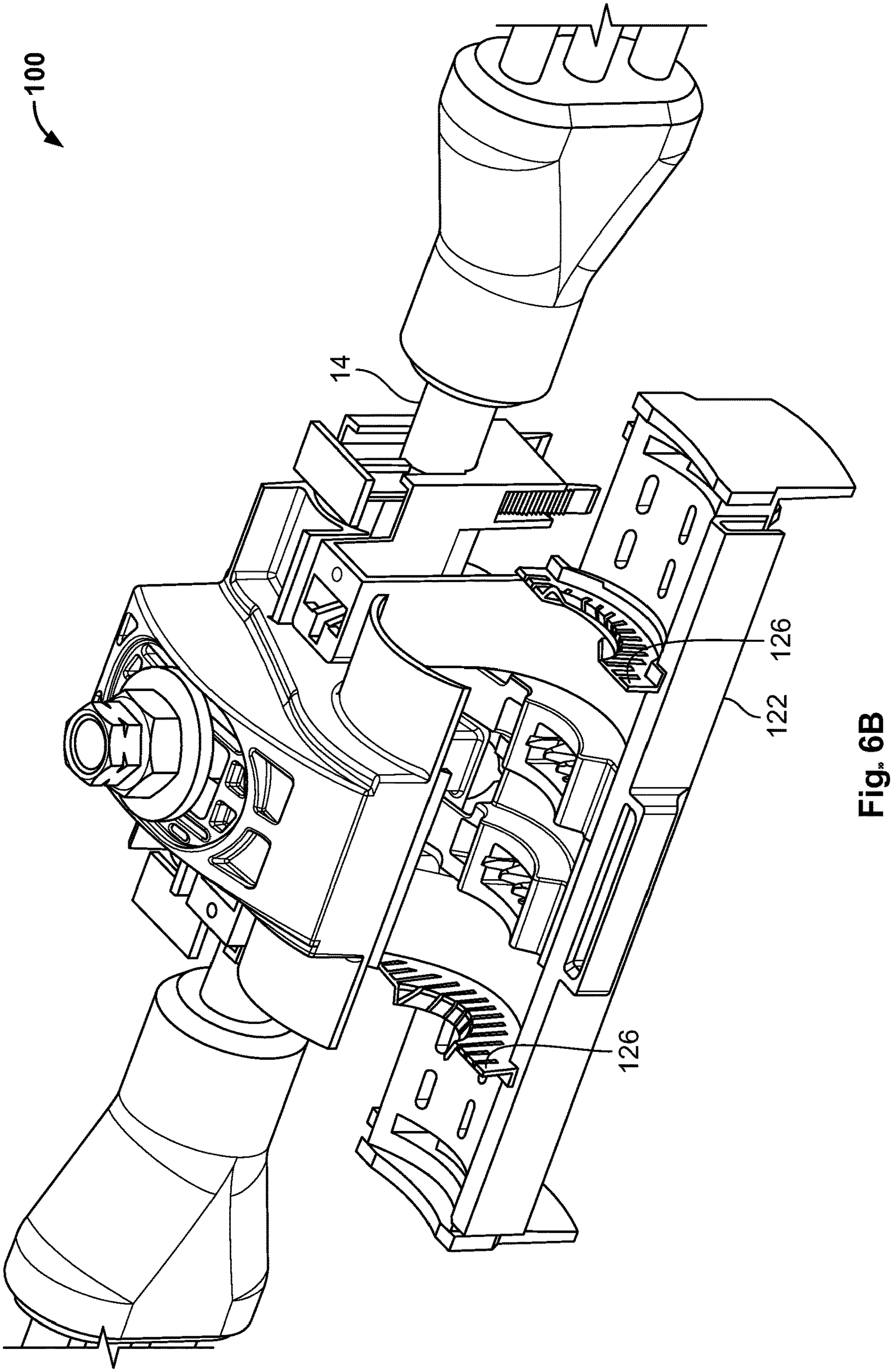
Figure 6C:
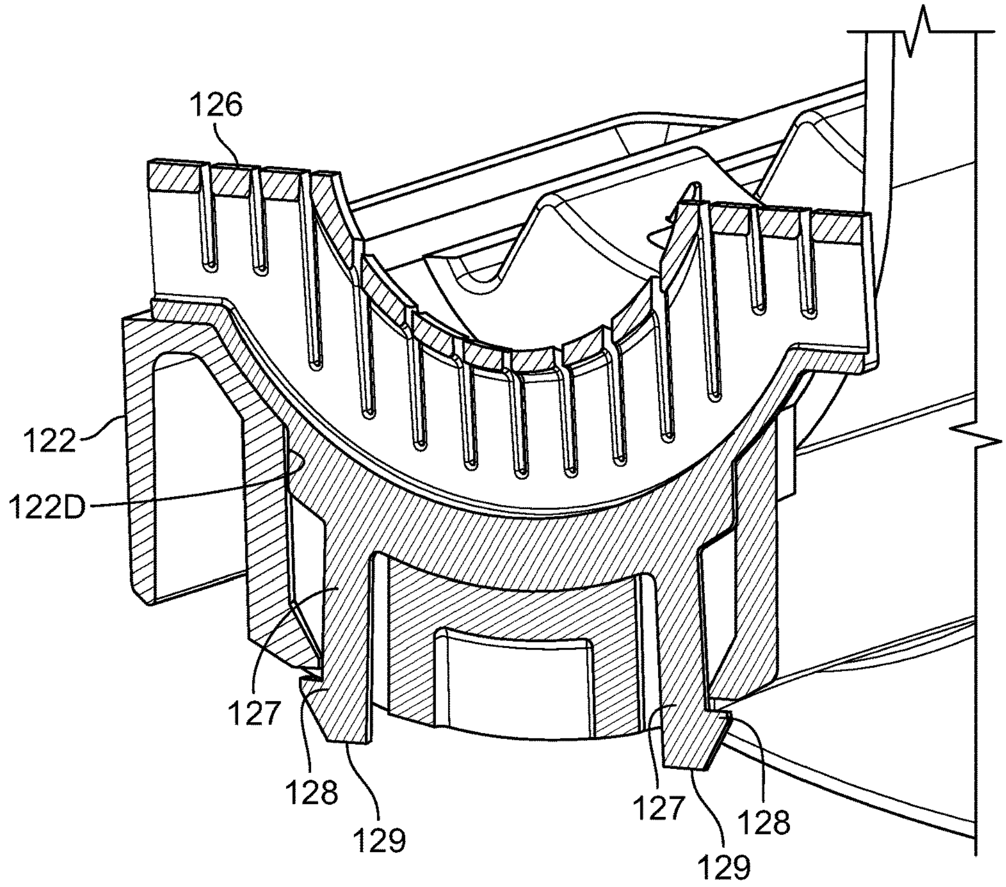
FIG. 6C is a cross-sectional view of the lower clamping jaw of FIG. 6A taken along line 6C-6C illustrating how each access restriction member can be attached to the clamping jaw.

Referring to FIGS. 6A-6C, in some embodiments, the cable receiving guide 122 of the lower clamping jaw 120 includes one or more members 126 that are configured to engage an outer surface (i.e., the insulation 12B) of the first cable 12 and restrict access into the cable receiving slot S1 by a person's finger, a tool, etc., when a connection has been made between the first and second cables 12, 14. In the embodiment illustrated in FIG. 6A, there are four access restriction members 126, two on each side of the sealing member 112. In FIG. 6B, there are two access restriction members 126, one on each side of the sealing member 112. Various numbers of access restriction members 126, including only one, may be utilized and embodiments of the present inventive concept are not limited to any particular number of access restriction members 126.

FIG. 6C is a cross-sectional view of the lower clamping jaw of FIG. 6A taken along line 6C-6C illustrating how the access restriction members 126 are attached to the cable receiving guide 122 of the lower clamping jaw 120 according to some embodiments. In the illustrated embodiment, each access restriction member 126 includes a pair of arms 127 with engagement barbs 128 at the distal end 129 thereof that matingly engage with a channel 122D formed in the cable receiving guide 122, as illustrated in FIG. 6A. However, the present inventive concept is not limited to the illustrated embodiment. Access restriction members 126 may be attached to the cable receiving guide 122 in various ways, without limitation.

Figure 7:
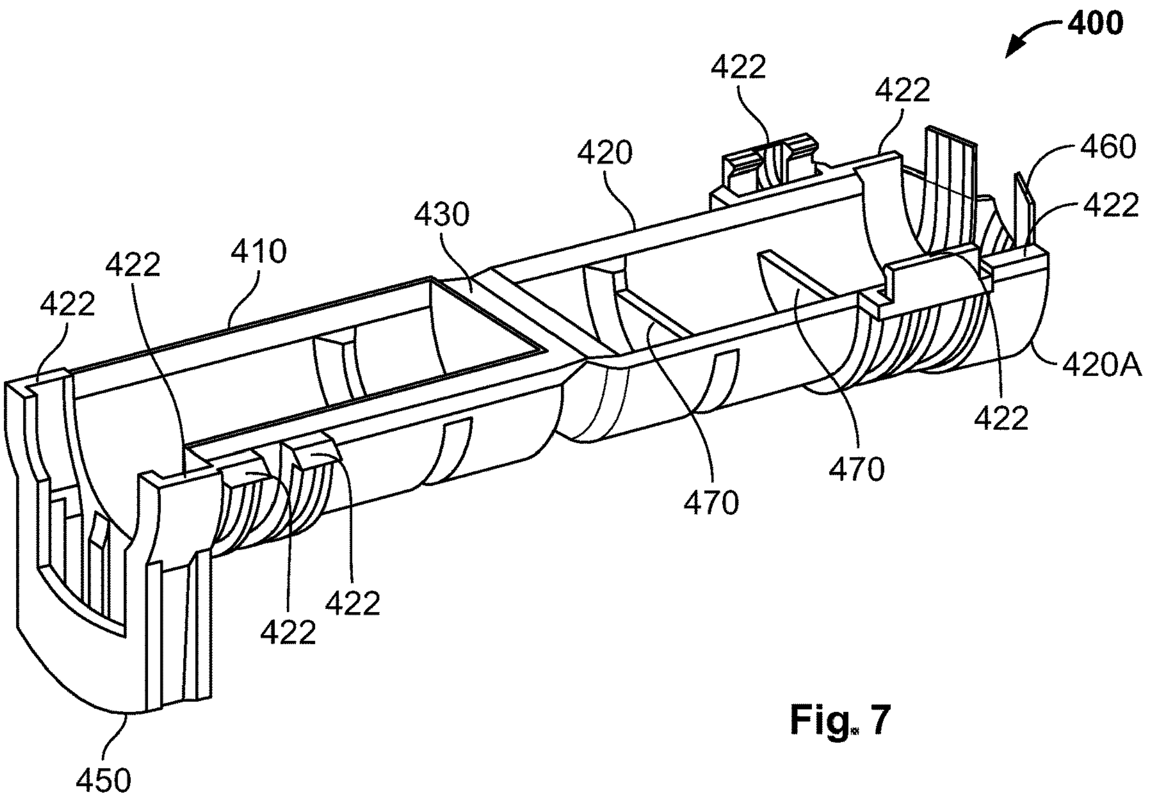
FIG. 7 is a perspective view of the protective end cap of the electrical connector assembly of FIG. 1 with the first and second portions in an open position.

Referring to FIGS. 1 and 7, the protective end cap 400 will be described. The protective end cap 400 is configured to be attached to the male connector member 150 on the lower clamping jaw 120 and is configured to enclose (e.g., snugly enclose) the terminal end of the first cable 12. The illustrated end cap 400 includes first and second generally semi-cylindrical portions 410, 420 that are pivotally connected by a hinge 430. The first and second portions 410, 420 are pivotable about the hinge 430 between an open position (FIGS. 1, 7, and 3I) to receive the terminal end of the first cable 12 (with the elastomeric seal 300 thereon) and a closed position (FIGS. 3J-3M, 8 and 9). In the closed position, the first and second portions 410, 420 define an enclosure cavity 400C (FIG. 3J) that is configured to enclose (e.g., snugly enclose) the terminal end of the first cable with the elastomeric seal 300 thereon.

The end cap 400 can be formed from various materials. In some embodiments, the endcap is formed from a polymeric material, such as polypropylene. However, in other embodiments, any polymeric material that is suitable for use with a live hinge can be utilized. In some embodiments, the first and second portions 410, 420 can be formed as two separate pieces with a snap together hinge at the back instead of a live hinge. This would allow for the end cap 400 to be made of a stiffer material, such as polyamide. In some embodiments, the first housing portion 410 could be formed from polyamide and the second housing portion 420 could be formed from polypropylene.

Figure 3B:
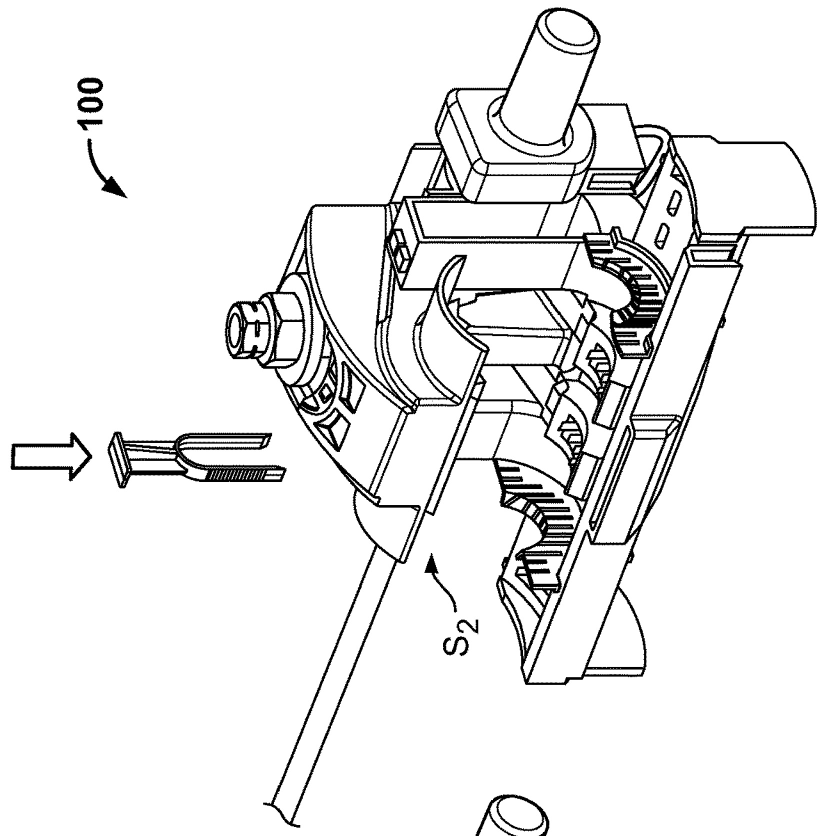
FIGS. 3A-3M illustrate operations for mechanically and electrically connecting first and second cables using the electrical connector assembly of FIG. 1.
Figure 3A:
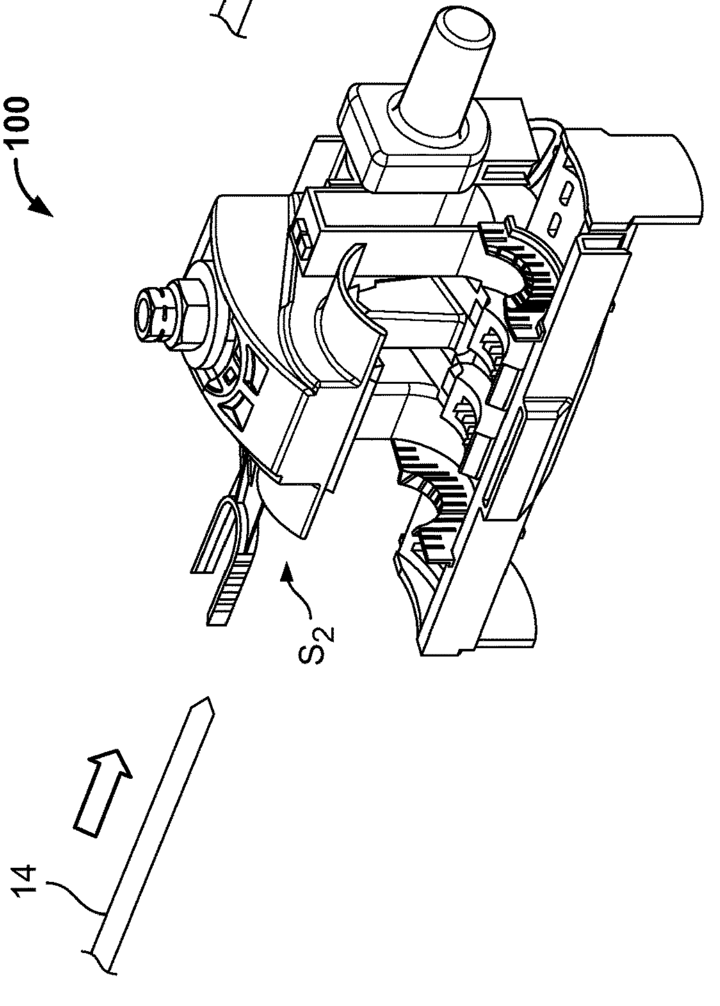
Figure 3D:
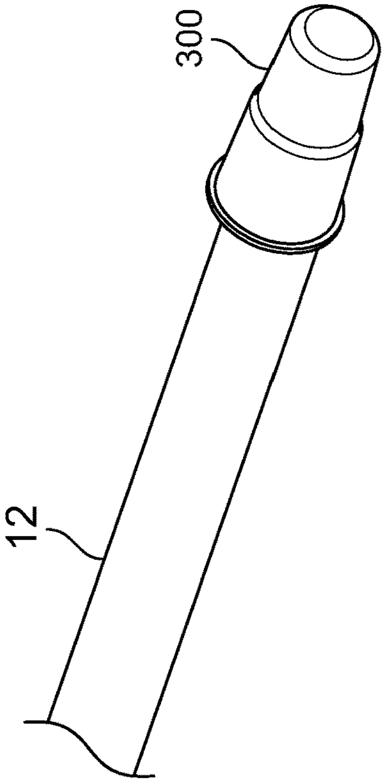
Figure 3C:
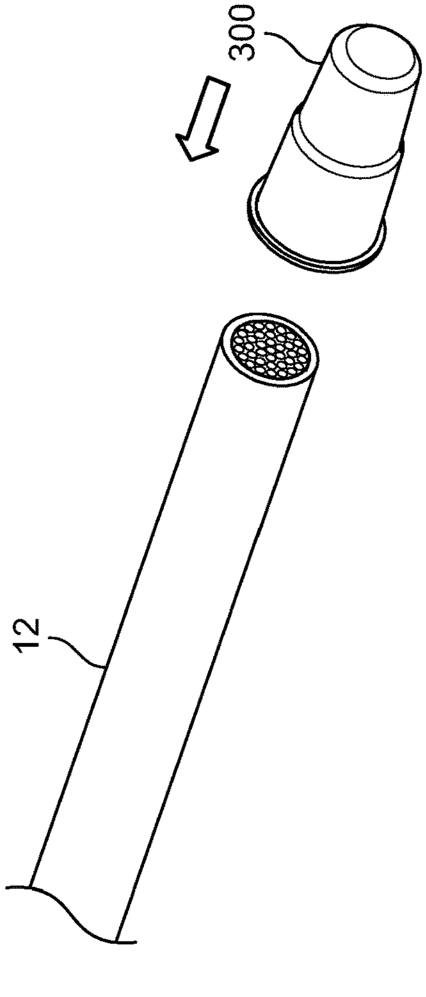
Figure 3E:
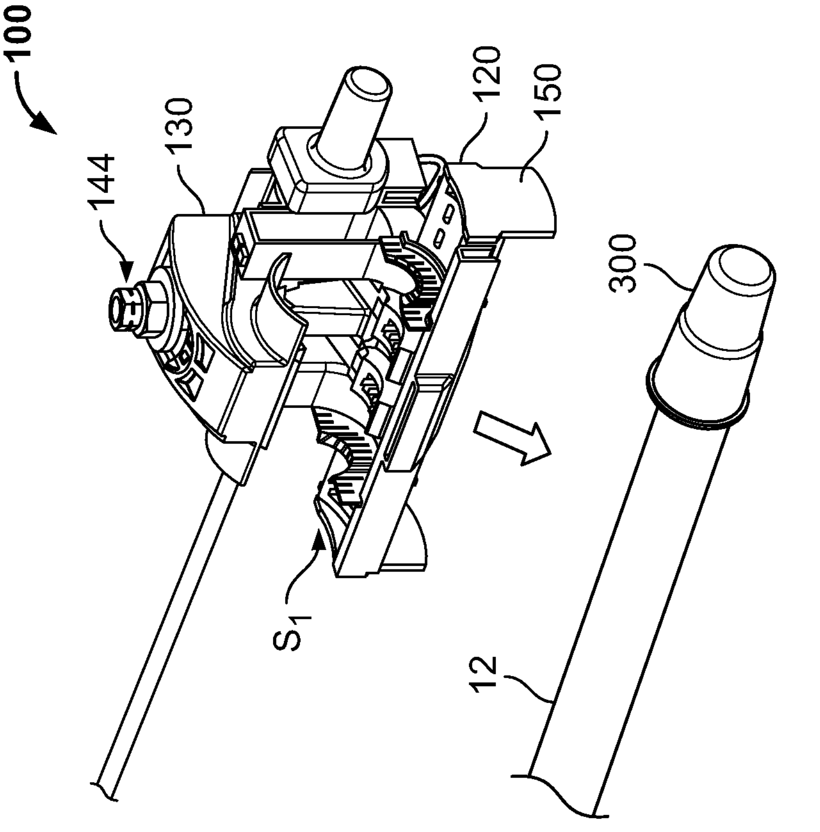
Figure 3F:
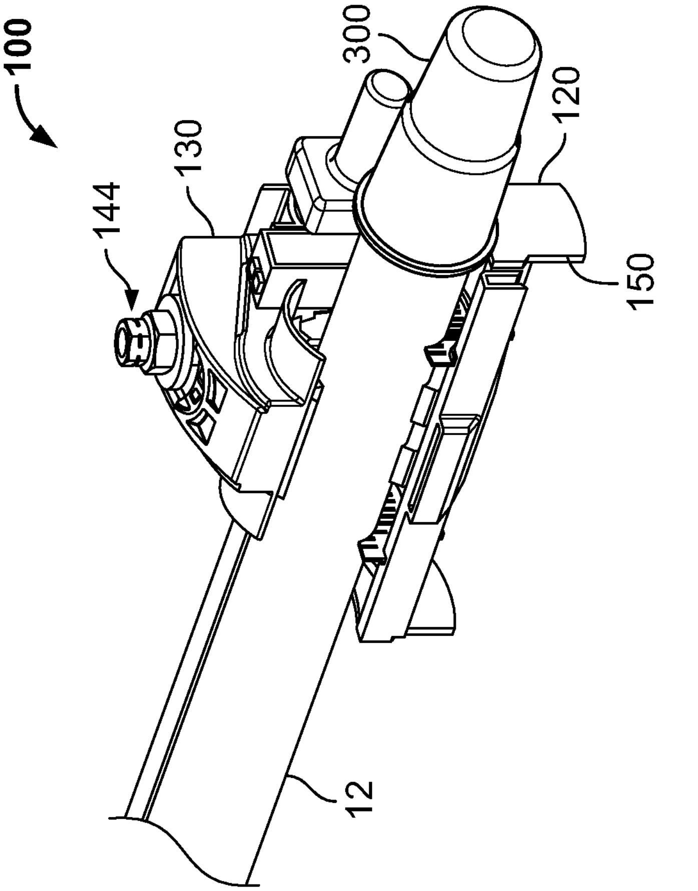
Figure 3H:
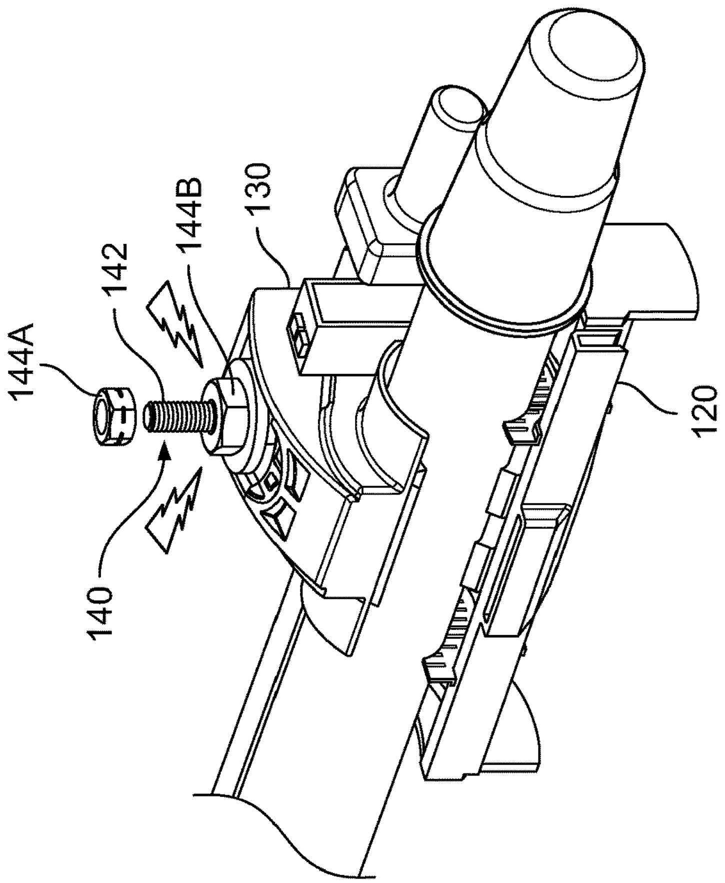
Figure 3G:
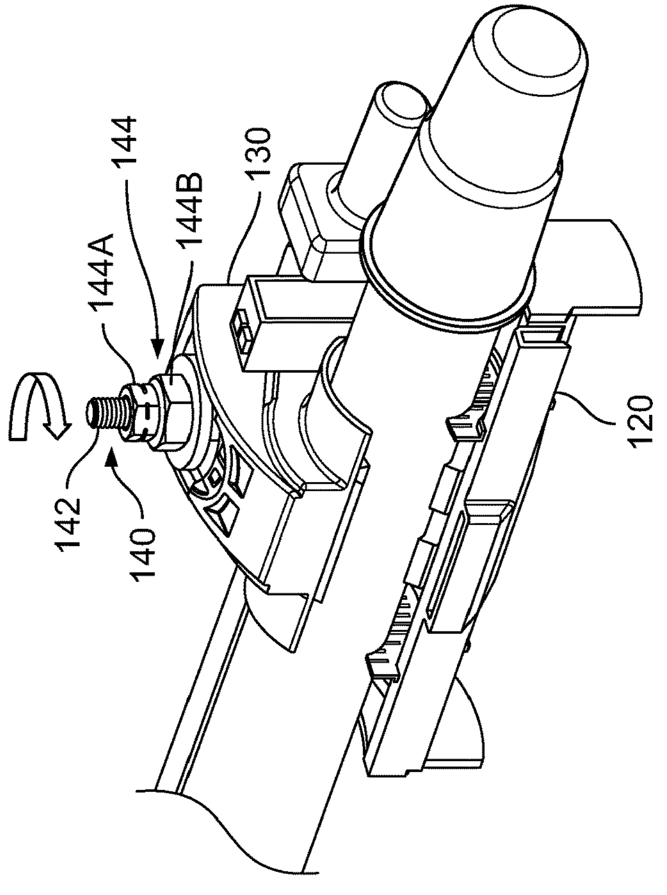
Figure 3J:
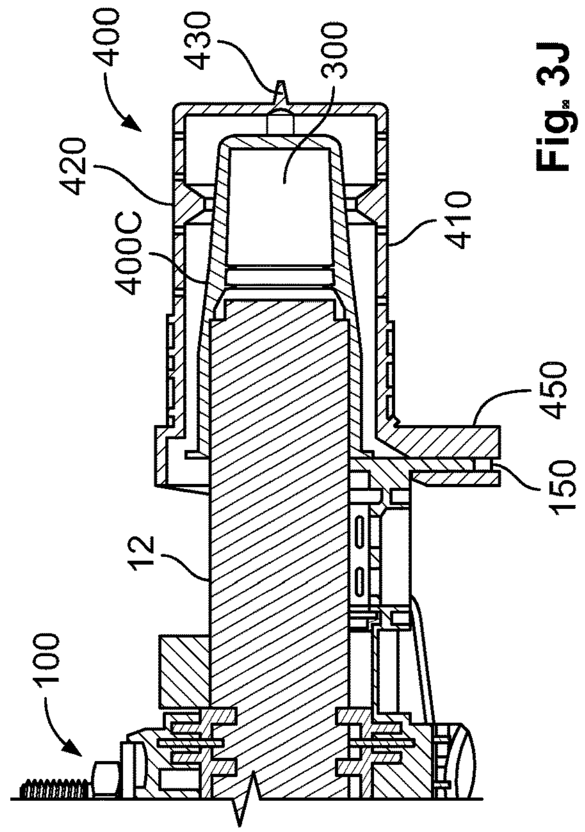

The first portion 410 of the illustrated end cap 400 includes a female connector member 450 that is shaped to matingly receive the male connector member 150 therein. A free end of the second portion 420 of the end cap 400 is configured to be attached to the female connector member 450 when the first and second portions 410, 420 are in the closed position, as illustrated in FIGS. 3J-3K, such that the male connector member 150 is securely enclosed by the end cap 400. The second portion 420 of the end cap 400 includes attachment features 422 that engage with attachment features 422 on the female connector member 450 and with attachment features 422 on the first portion 410 when the first and second portions 410, 420 are moved to the closed position. These attachment or locking features 422 lock the first and second portions 410, 420 in the closed position around the terminal end of the first cable 12 and around the male connector member 150.

Embodiments of the present inventive concept are not limited to the illustrated arrangement of the male connector member 150 and female connector member 450. In some embodiments, these connector members may be reversed. That is, the first portion 410 of the end cap 400 may include a male connector member that is configured to be received within a female connector member that is attached or integral with the cable receiving guide 122 of the lower clamping jaw 120.

In the illustrated embodiment, the second portion 420 of the end cap 400 includes a member 460 that is configured to engage an outer surface (i.e., the insulation layer 12B) of the first cable 12 and restrict access (for example, by a user's finger, a tool, a rodent, etc.) into the enclosure cavity 400C when the first and second portions 410, 420 of the end cap 400 are in the closed position. The member 460 may have various shapes and configurations and is not limited to the illustrated embodiment. In addition, the member 460 may have some flexibility so that it sufficiently closes any opening between the outer surface of the first cable 12 and the enclosure cavity 400C.

In some embodiments, at least one of the first and second portions 410, 420 of the end cap 400 includes one or more removable ribs or spacers 470. These spacers 470 facilitate the enclosure cavity 400C being able to snugly enclose the terminal end of smaller cables, also. The spacers 470 can be sized and selected so that cables of different sizes may be accommodated within the enclosure cavity 400C. In the illustrated embodiment, the second portion 420 of the end cap 400 includes a pair of spacers 470. However, embodiments of the present inventive concept are not limited to the illustrated embodiment. Various numbers of spacers 470, including a single spacer, may be utilized.

Figure 10A:
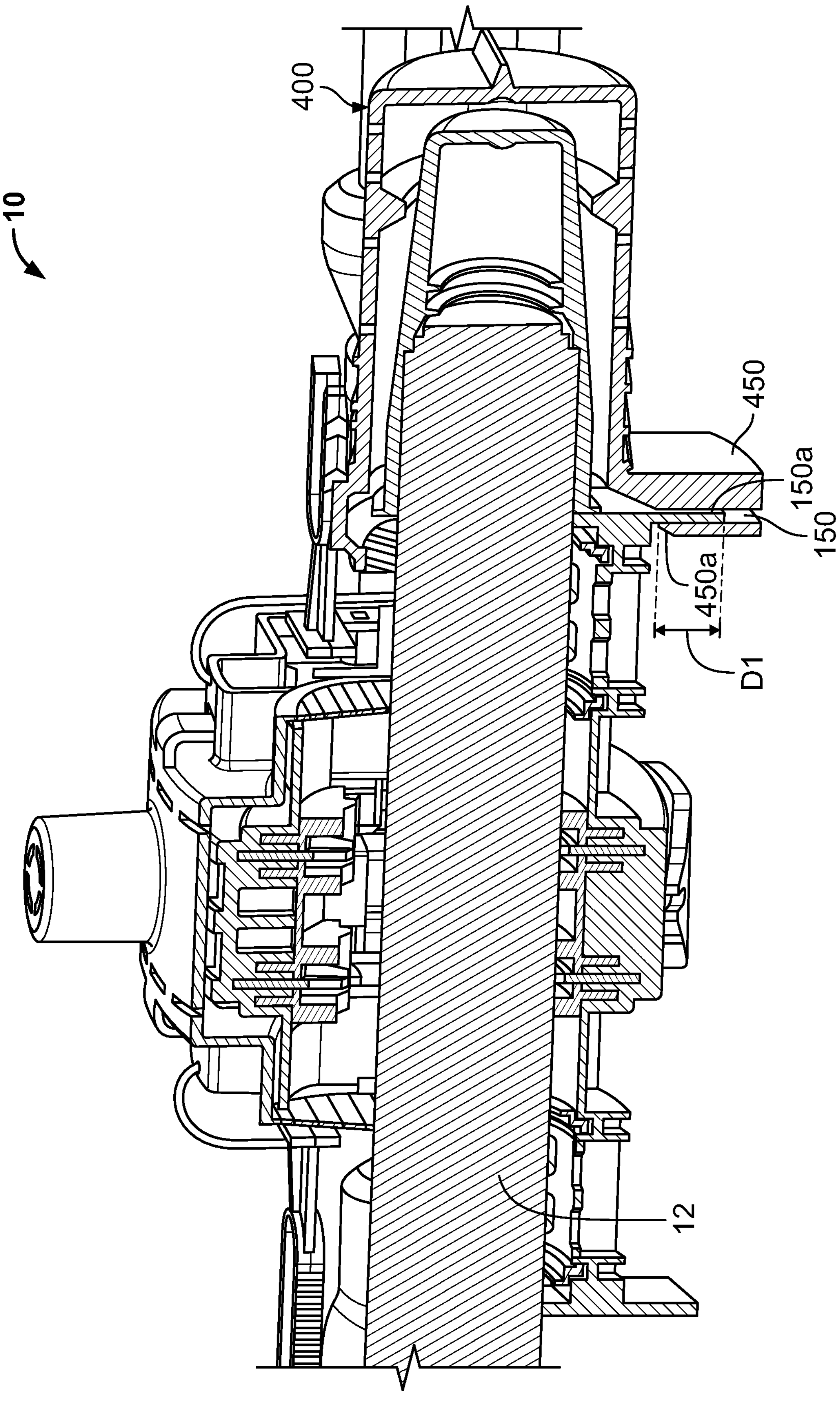
FIGS. 10A and 10B are cross-sectional views of the electrical connector assembly of FIG. 1 and that illustrate the ability of the end cap to accommodate cables of different sizes.
Figure 10B:
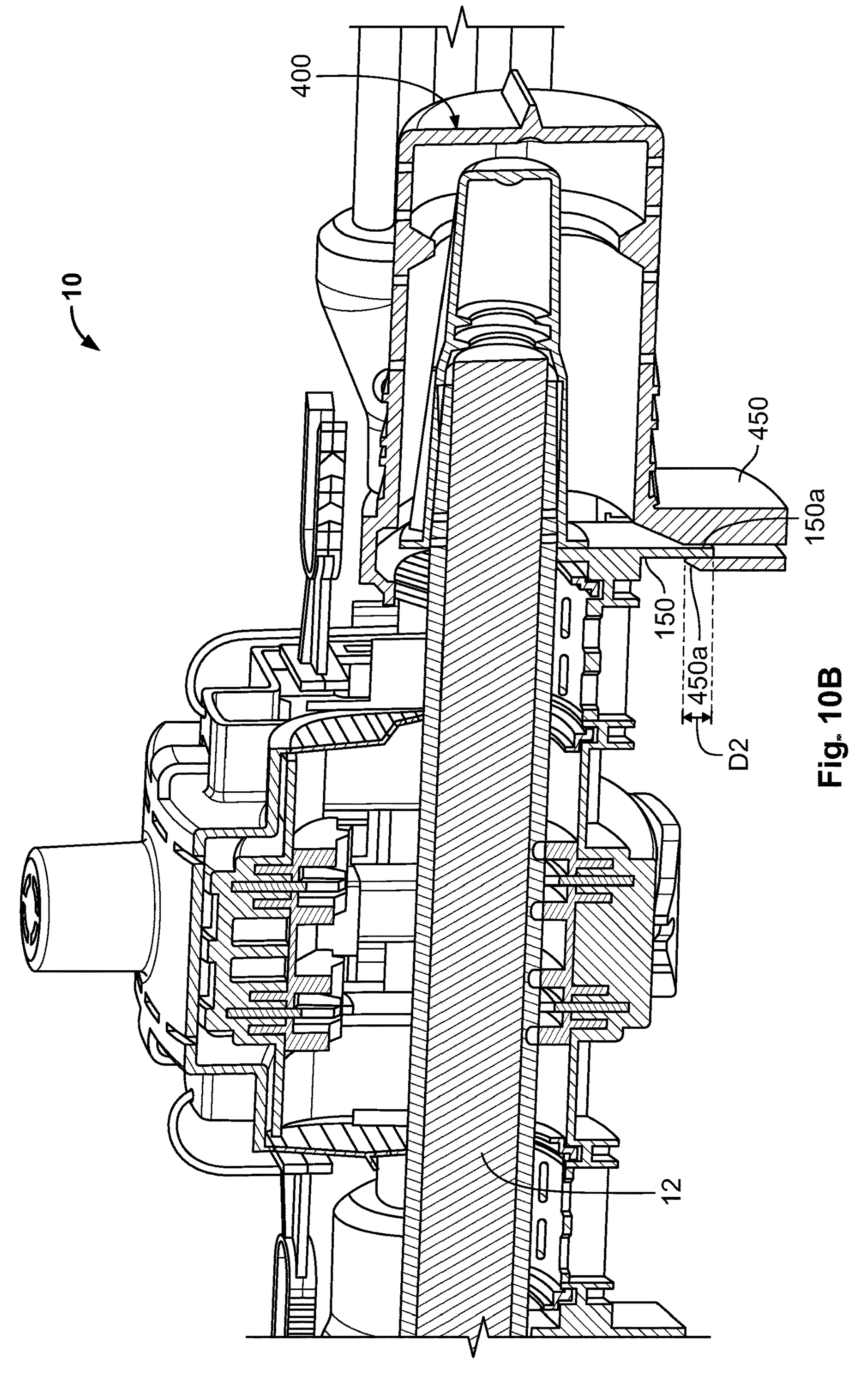

FIGS. 10A and 10B are cross-sectional views of the electrical connector assembly 10 of FIG. 1 that illustrate the ability of the end cap 400 to accommodate a first cable 12 of different sizes. In FIG. 10A the first cable 12 is larger in diameter than the first cable 12 in FIG. 10B. The ability of the female connector member 450 on the end cap 400 and the male connector member 150 on the cable receiving guide 122 to move or slide relative to each other, while still being connected to each other, allows the end cap 400 to accommodate a first cable 12 of different diameters. As shown in FIGS. 10A and 10B, the distance D1 (FIG. 10A) between the lower end 150*a* of the male connector member 150 and a portion 450*a* of the female connector member 450 is greater than the distance D2 (FIG. 10B) between the lower end 150*a* of the male connector member 150 and the same portion 450*a* of the female connector 450. This is because the first cable 12 in FIG. 10A is larger in diameter than the first cable 12 in FIG. 10B.

Referring to FIGS. 3A-3M, operations for using the electrical connector assembly 10 for mechanically and electrically connecting first and second cables 12, 14, according to embodiments of the present inventive concept are illustrated. A tap cable (or tap cable harness) 14 is initially installed within the tap side cable receiving slot S2 of the IP connector 100, as illustrated in FIGS. 3A-3B. Next, an elastomeric seal 300 is installed on the terminal end of the first cable 12, as illustrated in FIGS. 3C-3D. The main cable is then placed within the main side cable receiving slot S1, as illustrated in FIGS. 3E-3F. Next, the clamping mechanism 140 is engaged to move the lower and upper clamping jaws 120, 130 together so that the piercing teeth 116T and 118T of the piercing blades 116, 118 can pierce through the insulation 12B, 14B of the main cable 12 and tap cable 14 and contact the respective conductors 12A, 14A. This is done by rotating the nut 144 until the shear head 144A breaks off, as illustrated in FIGS. 3G-3H.

Figure 3I:
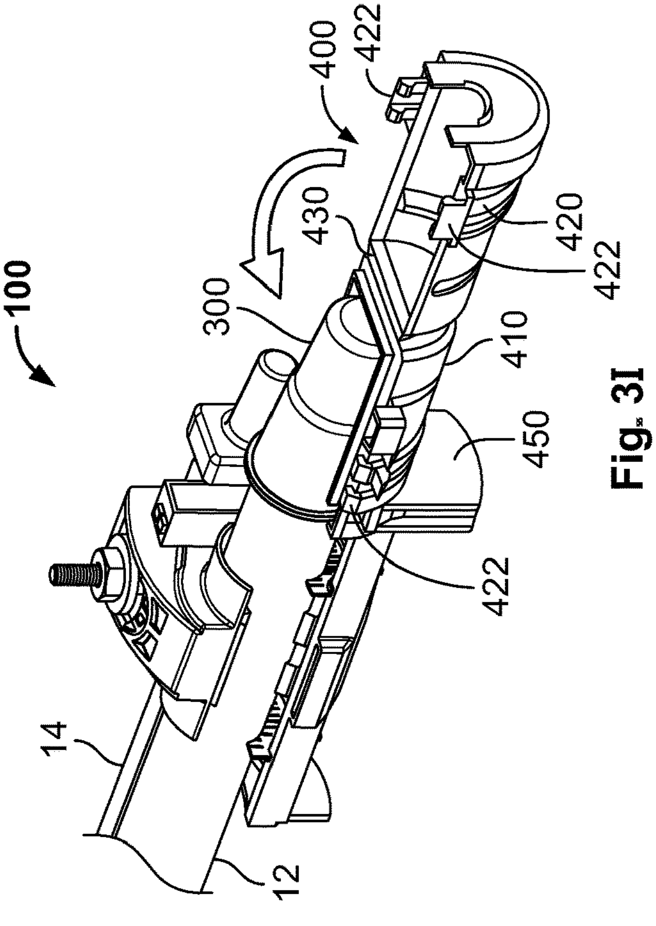
Figure 3K:
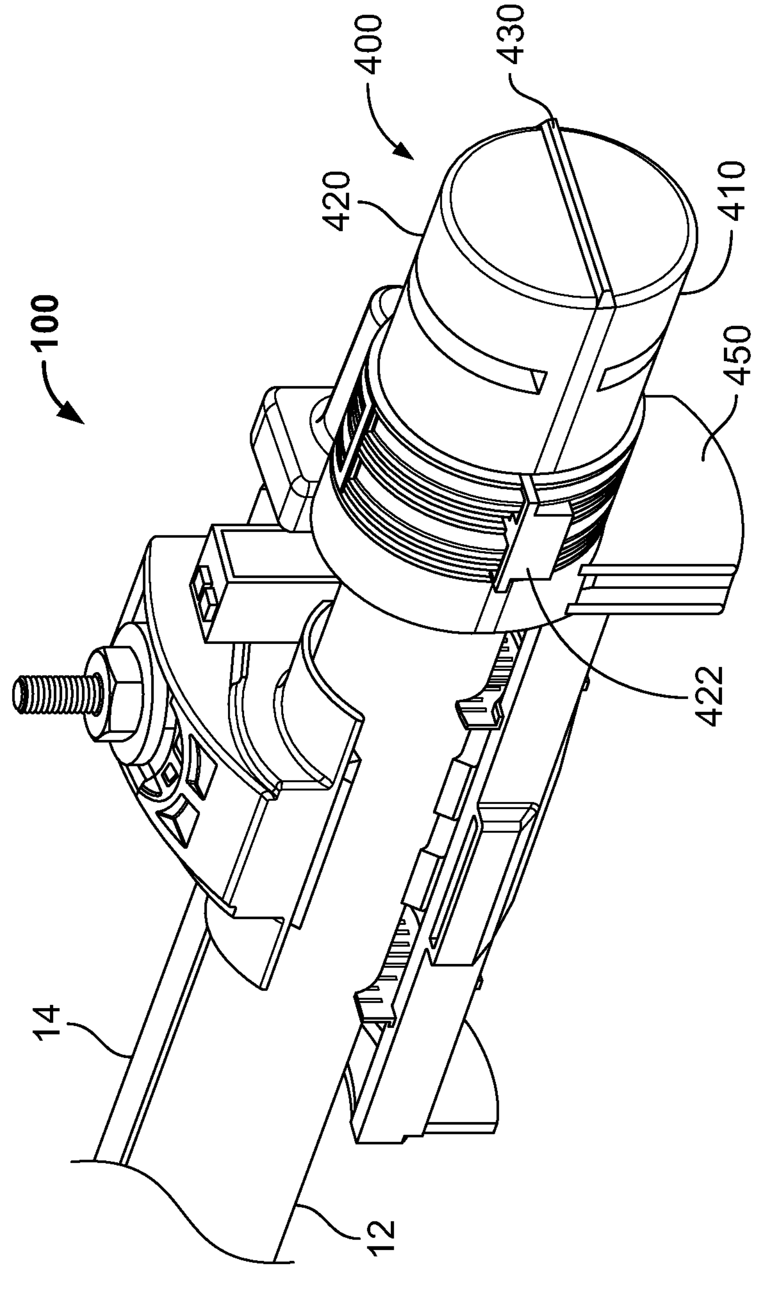
Figure 3M:
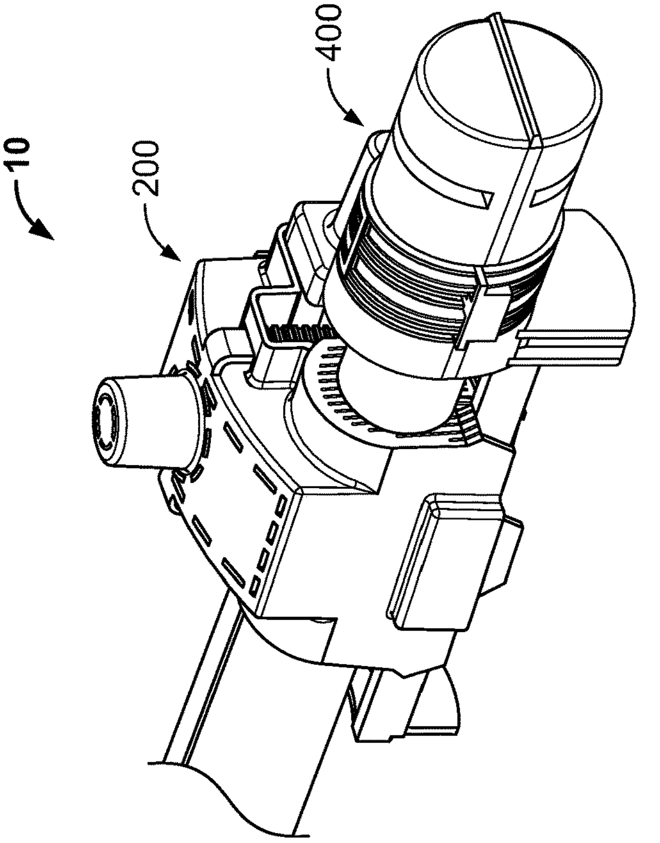
Figure 3L:
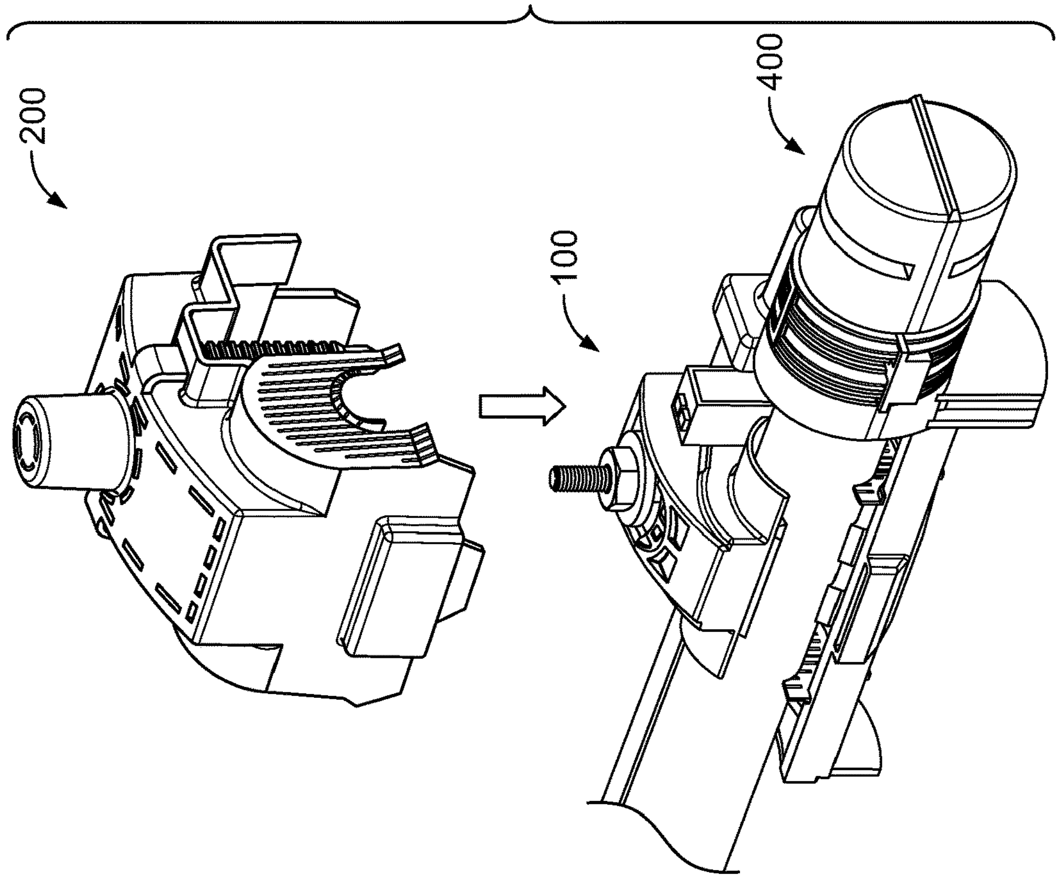

The protective end cap 400 is then attached to the lower clamping jaw 120 by inserting the male connector member 150 on the end of the cable receiving guide 122 into the female component 450 of the first portion 410 of the end cap 400 while the first and second portions 410, 420 are in the open position, as illustrated in FIG. 3I. This also positions the first portion 410 of the end cap 400 to receive the terminal end of the first cable 12 with the elastomeric seal 300 thereon. The second portion 420 of the end cap 400 is then pivoted about the hinge 430 to the closed position as illustrated in FIGS. 3J-3K. The attachment features 422 of the first and second portions 410, 420 engage and the first and second portions 410, 420 of the end cap 400 are then locked together and to the male connector 150. Finally, the enclosure 200 is installed around the IP connector 100, as illustrated in FIGS. 3L-3M, to complete the electrical connector assembly 10. The enclosure is configured to protect the IP connector 100 and the connection between the first and second cables 12, 14 from the environment.

Figure 8:
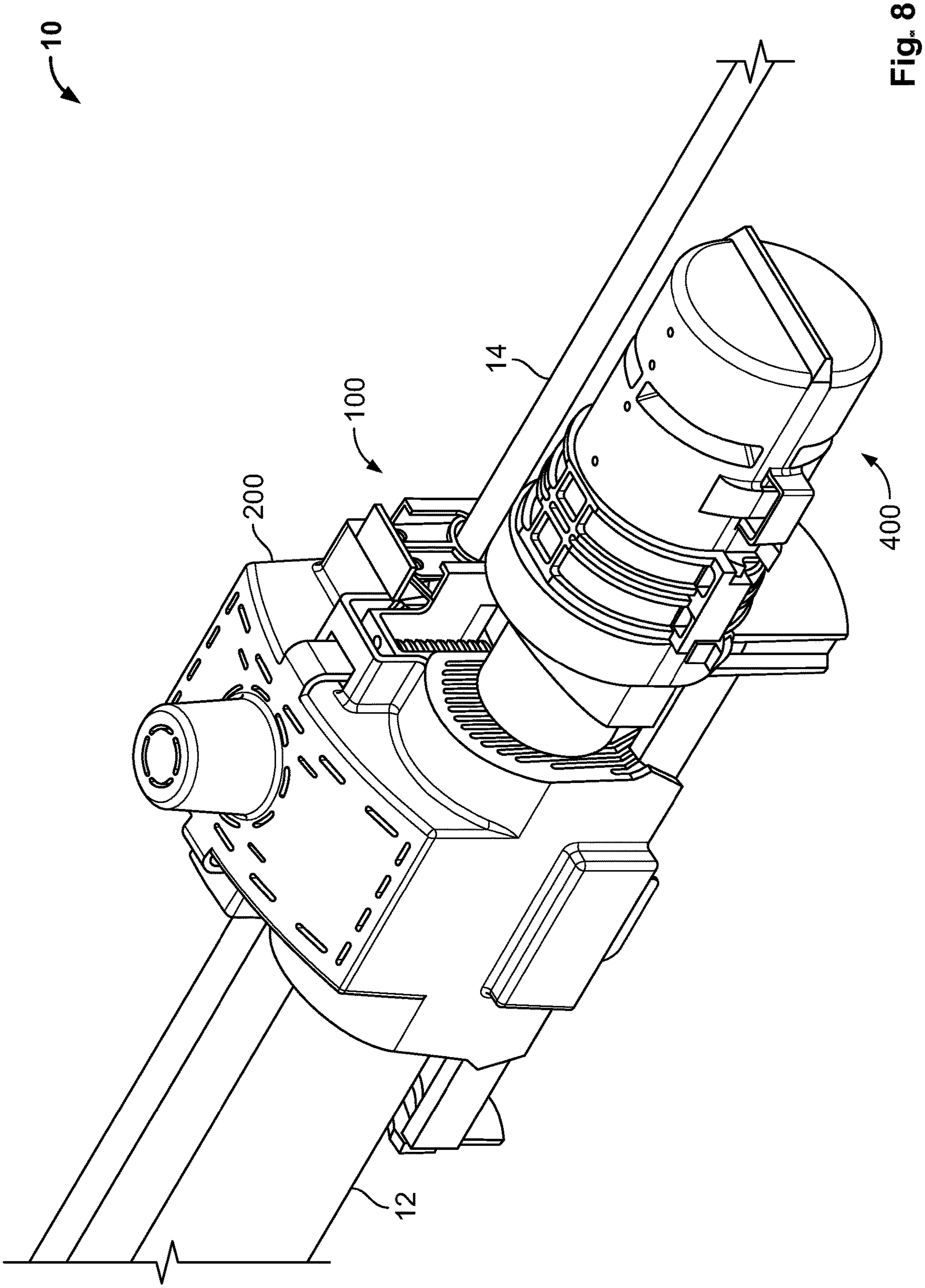
FIGS. 8 and 9 are perspective views of the electrical connector assembly of FIG. 1 with first and second cables mechanically and electrically connected by the IP connector and with a terminal end of the first cable enclosed by the protective end cap.
Figure 9:
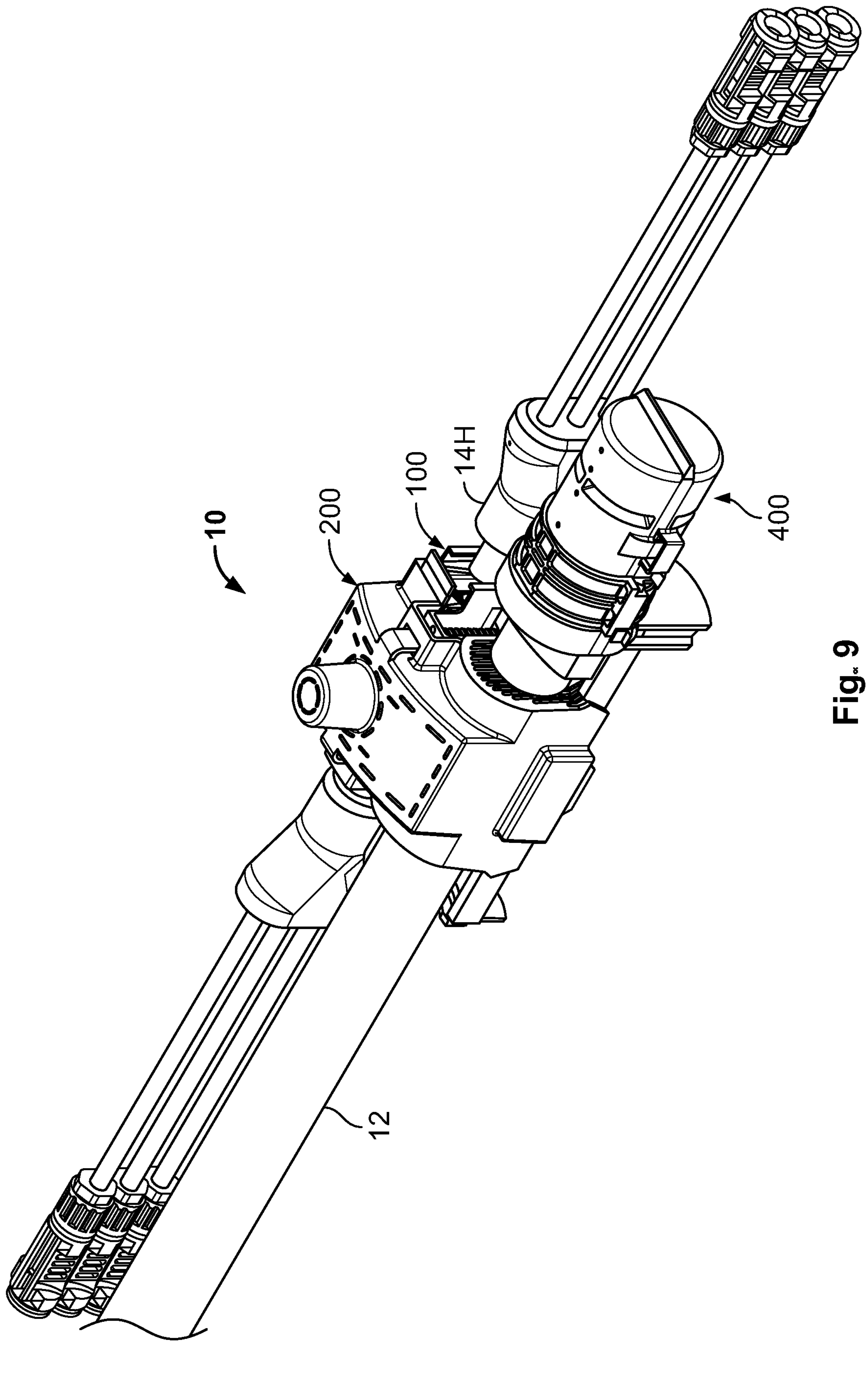

FIGS. 8 and 9 are perspective views of the electrical connector assembly 10 of FIG. 1 with first and second cables 12, 14 mechanically and electrically connected by the IP connector 100 and with a terminal end of the first cable 12 enclosed by the protective end cap 400. FIG. 8 illustrates a main cable 12 attached to a tap cable 14, and FIG. 9 illustrates a main cable attached to a tap cable harness 14H.

Embodiments of the present inventive concept have been described above with reference to the accompanying drawings, in which embodiments of the inventive concept are shown. The present inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. Like numbers refer to like elements throughout.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element, without departing from the scope of the present inventive concept. As used herein, the term “and/or” includes any and all combinations of one or more of the associated listed items.

It will be understood that when an element is referred to as being “on” another element, it can be directly on the other element or intervening elements may also be present. In contrast, when an element is referred to as being “directly on” another element, there are no intervening elements present. It will also be understood that when an element is referred to as being “connected” or “coupled” to another element, it can be directly connected or coupled to the other element or intervening elements may be present. In contrast, when an element is referred to as being “directly connected” or “directly coupled” to another element, there are no intervening elements present. Other words used to describe the relationship between elements should be interpreted in a like fashion (i.e., “between” versus “directly between”, “adjacent” versus “directly adjacent”, etc.).

Relative terms such as “below” or “above” or “upper” or “lower” or “horizontal” or “vertical” may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the inventive concept. As used herein, the singular forms “a”, “an” and “the” are intended to include the plural forms as well, unless the context clearly indicates otherwise. It will be further understood that the terms “comprises”, “comprising,” “includes” and/or “including” when used herein, specify the presence of stated features, operations, elements, and/or components, but do not preclude the presence or addition of one or more other features, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of this disclosure and the relevant art and will not be interpreted in an idealized or overly formal sense unless expressly so defined herein.

As used herein, "monolithic" means an object that is a single, unitary piece formed or composed of a material without joints or seams.

Aspects and elements of all of the embodiments disclosed above can be combined in any way and/or combination with aspects or elements of other embodiments to provide a plurality of additional embodiments.

That which is claimed is:

1. An electrical connector assembly for mechanically and electrically connecting first and second cables each including an elongate electrical conductor covered by an insulation layer, the electrical connector assembly comprising:

an insulation piercing connector comprising:

a pair of clamping jaws, at least one of the jaws comprising at least one electrically conductive piercing member, and a male connector member extending outwardly from one of the clamping jaws;

a clamping mechanism configured and operable to force the at least one piercing member through the insulation layers of the first and second cables and into electrical engagement with the conductors of the first and second cables to form an electrical connection between the first and second cables; and a protective end cap configured to be secured to the male connector member and configured to enclose a terminal end of the first cable, wherein the protective end cap comprises first and second portions pivotally connected by a hinge.

2. The electrical connector assembly of claim 1, further comprising an elastomeric seal inserted over the terminal end of the first cable, and wherein the protective end cap is configured to snugly enclose the terminal end of the first cable.

3. The electrical connector assembly of claim 1, wherein the male connector member extends outwardly from the one of the clamping jaws in a direction transverse to a lengthwise axis of the first cable.

4. The electrical connector assembly of claim 1, wherein the first and second portions are relatively pivotable about the hinge between an open position to receive the terminal end of the first cable and a closed position wherein the first and second portions define an enclosure cavity to enclose the terminal end of the first cable.

5. The electrical connector assembly of claim 4, wherein the first portion comprises a female connector member shaped to matingly receive the male connector member, and wherein a free end of the second portion is configured to be attached to the female connector member when the first and second portions are in the closed position.

6. The electrical connector assembly of claim 4, wherein the first and second portions comprise attachment features configured to engage with each other and lock the first and second portions together when in the closed position.

7. The electrical connector assembly of claim 4, wherein the second portion comprises a member that is configured to engage an outer surface of the first cable and restrict access into the enclosure cavity when the first and second portions are in the closed position.

8. The electrical connector assembly of claim 4, wherein at least one of the first and second portions comprises one or more removable spacers that facilitate the enclosure cavity snugly enclosing the terminal end of the first cable.

9. The electrical connector assembly of claim 4, wherein the first and second portions are semi-cylindrical.

10. The electrical connector assembly of claim 1, wherein the male connector member is removably attached to the one of the clamping jaws.

11. The electrical connector assembly of claim 1, further comprising an enclosure configured to receive and cover the connection and to protect the insulation piercing connector.

12. An electrical connector assembly for mechanically and electrically connecting first and second cables each including an elongate electrical conductor covered by an insulation layer, the electrical connector assembly comprising:

an insulation piercing connector comprising:

a pair of clamping jaws, at least one of the jaws comprising at least one electrically conductive piercing member, and a male connector member extending outwardly from one of the clamping jaws; and a clamping mechanism configured and operable to force the at least one piercing member through the insulation layers of the first and second cables and into electrical engagement with the conductors of the first and second cables to form an electrical connection between the first and second cables;

an elastomeric seal inserted over a terminal end of the first cable; and a protective end cap configured to be secured to the male connector member, wherein the protective end cap comprises first and second portions pivotally connected by a hinge, wherein the first and second portions are relatively pivotable about the hinge between an open position to receive the terminal end of the first cable and a closed position wherein the first and second portions define an enclosure cavity configured to enclose the terminal end of the first cable.

13. The electrical connector assembly of claim 12, wherein the male connector member extends outwardly from the one of the clamping jaws in a direction transverse to a lengthwise axis of the first cable.

14. The electrical connector assembly of claim 12, wherein the first portion comprises a female connector member shaped to matingly receive the male connector member, and wherein a free end of the second portion is configured to be attached to the female connector member when the first and second portions are in the closed position.

15. The electrical connector assembly of claim 12, wherein the first and second portions comprise attachment features configured to engage with each other and lock the first and second portions together when in the closed position.

16. The electrical connector assembly of claim 12, wherein the male connector member is integrally formed with the one of the clamping jaws or is attached to the one of the clamping jaws.

17. The electrical connector assembly of claim 12, further comprising an enclosure configured to receive and cover the connection and to protect the insulation piercing connector.

18. An electrical connector assembly for mechanically and electrically connecting first and second cables each including an elongate electrical conductor covered by an insulation layer, the electrical connector assembly comprising:

an insulation piercing connector comprising:

a pair of clamping jaws, at least one of the jaws comprising at least one electrically conductive piercing member, and one of the clamping jaws comprising a connector member;

a clamping mechanism configured and operable to force the at least one piercing member through the insulation layers of the first and second cables and into electrical engagement with the conductors of the first and second cables to form an electrical connection between the first and second cables; and a protective end cap configured to be secured to the connector member and configured to enclose a terminal end of the first cable, wherein the protective end cap comprises first and second portions pivotally connected by a hinge.

19. The electrical connector assembly of claim 18, wherein the connector member is a male connector member and the end cap comprises a female connector member shaped to matingly receive the male connector member.

20. The electrical connector assembly of claim 18, wherein the end cap comprises a male connector member and wherein the connector is a female connector member shaped to matingly receive the male connector member.

* * * * *